(12) United States Patent
Wang et al.

(10) Patent No.: US 10,225,348 B2
(45) Date of Patent: Mar. 5, 2019

(54) EFFICIENT COMMUNICATIONS AMONGST COMPUTING NODES FOR OPERATING AUTONOMOUS VEHICLES

(71) Applicants: Baidu USA LLC, Sunnyvale, CA (US); Baidu.com Times Technology (Beijing) Co., Ltd., Beijing (CN)

(72) Inventors: Quan Wang, San Jose, CA (US); Liming Xia, Beijing (CN); Jingchao Feng, Beijing (CN); Ning Qu, Fremont, CA (US); James Peng, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 281 days.

(21) Appl. No.: 15/115,249

(22) PCT Filed: Jul. 21, 2016

(86) PCT No.: PCT/CN2016/090827
§ 371 (c)(1),
(2) Date: Jul. 28, 2016

(87) PCT Pub. No.: WO2018/014282
PCT Pub. Date: Jan. 25, 2018

(65) Prior Publication Data
US 2018/0183873 A1   Jun. 28, 2018

(51) Int. Cl.
*G06F 12/00* (2006.01)
*G06F 13/00* (2006.01)
(Continued)

(52) U.S. Cl.
CPC .......... *H04L 67/12* (2013.01); *G05D 1/0088* (2013.01); *H04L 67/02* (2013.01)

(58) Field of Classification Search
None
See application file for complete search history.

(56) References Cited

U.S. PATENT DOCUMENTS

2001/0021944 A1\* 9/2001 Inaba ............... G06F 15/17
                                                      709/213
2009/0198891 A1\* 8/2009 Arimilli ............ G06F 12/0815
                                                      711/118
(Continued)

*Primary Examiner* — Sean D Rossiter
(74) *Attorney, Agent, or Firm* — Womble Bond Dickinson (US) LLP

(57) ABSTRACT

A first request is received from a first processing node to produce data blocks of a first data stream representing a first communication topic. The first processing node is one of the processing nodes handling a specific function of operating an autonomous vehicle. Each of the processing nodes is executed within a specific node container having a specific operating environment. A global memory segment is allocated from a global memory to store the data blocks of the first data stream. A first local memory segment is mapped to the global memory segment. The first local memory segment is allocated from a first local memory of a first node container containing the first processing node. The first processing node directly accesses the data blocks of the first data stream stored in the global memory segment by accessing the mapped first local memory segment within the first node container.

21 Claims, 10 Drawing Sheets

(51) Int. Cl.
*H04L 29/08* (2006.01)
*G05D 1/00* (2006.01)

(56) References Cited

U.S. PATENT DOCUMENTS

| | | | |
|---|---|---|---|
| 2015/0089009 A1* | 3/2015 | Tsirkin | G06F 3/067 709/212 |
| 2016/0188529 A1* | 6/2016 | Nagarajan | G06F 12/0813 711/151 |

\* cited by examiner

| Node ID 501 | Access Pointer 502 | Timestamp 503 | Callback 504 |
|---|---|---|---|
| Producer | Write Pointer | ... | ... |
| Subscriber 1 | Read Pointer 1 | ... | ... |
| Subscriber 2 | Read Pointer 2 | ... | ... |
| ... | ... | ... | ... |

| Data Block ID 551 | Status 552 | Node ID 553 | Timestamp 554 |
|---|---|---|---|
| Block 1 | Being Written | ... | ... |
| Block 2 | | ... | ... |
| Block 3 | Being Read | ... | ... |
| ... | ... | ... | ... |

FIG. 5B

EFFICIENT COMMUNICATIONS AMONGST COMPUTING NODES FOR OPERATING AUTONOMOUS VEHICLES

RELATED APPLICATIONS

This application is a U.S. national phase application claiming the priority of PCT application No. PCT/CN2016/090827, filed Jul. 21, 2016, which is incorporated by reference in its entirety.

FIELD OF THE INVENTION

Embodiments of the present invention relate generally to operating autonomous vehicles. More particularly, embodiments of the invention relate to efficient communications amongst computing nodes for operating autonomous vehicles.

BACKGROUND

Autonomous vehicles typically can operate in a manual mode or an autonomous mode. Vehicles operating in a manual mode respond to drivers' input. When operating in an autonomous mode, a vehicle can navigate to various locations using onboard sensors, allowing the vehicle to travel with minimal human interaction or in some cases without any passengers. Vehicles operating in an autonomous mode (e.g., driverless) can relieve occupants, especially the driver, from some driving-related responsibilities.

Compared with traditional vehicles, self-driving vehicles internally have a considerably higher demand for computational power. The internal architecture of autonomous vehicles computer(s) typically consists of a number of nodes containing programs for various tasks of autonomous driving such as sensor processing, perception, planning and controls, as well as communication channels linking those nodes and passing data for mutual interested topics.

Since the usability, user experience, and safety of autonomous vehicles heavily rely on the real-time performance of the end-to-end computation, the performance requirement for communications amongst the nodes is also very high. Typical requirements include but not limited to: high throughput especially for data channels, low latency especially for control channels, low processor occupation, low message drop rate, and other advanced features such as the ability to negotiate flexible communication rate. Other requirements indirectly related to communication mechanism include program/process isolation and resource management leading to improved system robustness and stability. Conventional architectures cannot satisfy such requirements.

BRIEF DESCRIPTION OF THE DRAWINGS

Embodiments of the invention are illustrated by way of example and not limitation in the figures of the accompanying drawings in which like references indicate similar elements.

FIG. 5A is a block diagram illustrating a data structure for storing segment metadata according to one embodiment of the invention.

FIG. 5B is a block diagram illustrating a data structure representing a data block index according to one embodiment of the invention.

DETAILED DESCRIPTION

Figure 1:
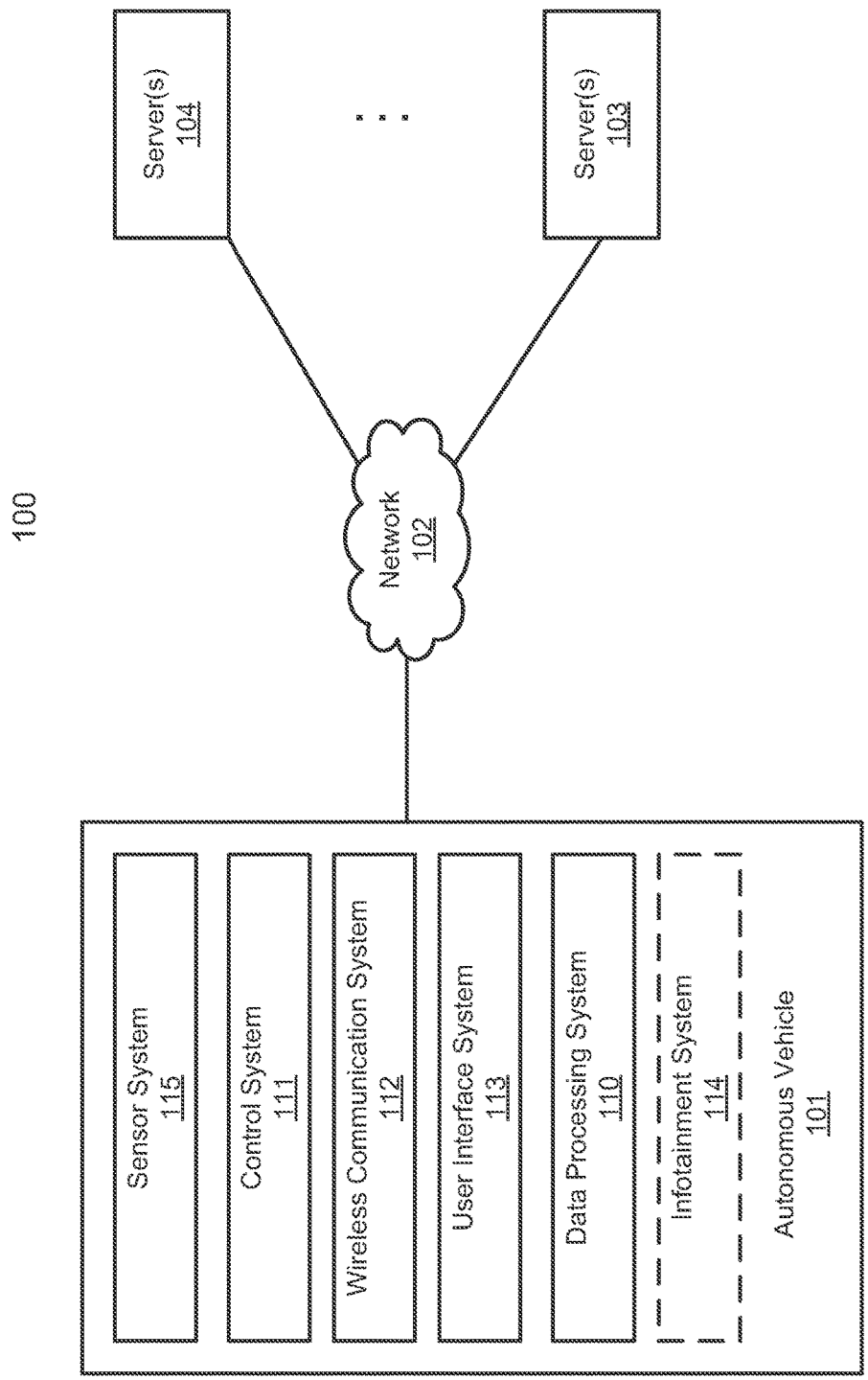
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a highly efficient communication mechanism is utilized amongst processing nodes within an autonomous vehicle, where the communication mechanism is based on shared memory segments amongst node containers containing the processing nodes. The new communication mechanism offers significant advantages over traditional approaches with respect to the performance and stability factors. In one embodiment, each computation task is performed by a processing node hosted by a separated node container (e.g., a virtual machine), which may be executed in a form of a process, with different root directory or even further isolated. As a result, the system stability and reliability can be maintained. The communication mechanism manages a shared global memory segment as the foundation of inter-node communication. Multiple publishers and subscribers in different node containers interested in the same topic, send and receive data by directly accessing the shared global memory mapped into their own local memory address spaces to achieve higher performance with high stability and reliability.

In one embodiment, when a first request is received from a first processing node as a producer node to produce or post data blocks of a data stream associated with a communication topic to be subscribed by another processing node, a global memory segment is allocated from a global memory to store the data blocks of the data stream. The first processing node is one of a number of processing nodes running within a data processing system that operates an autonomous vehicle. Each of the processing node may be configured to perform a specific function of operating the autonomous vehicle. For stability, reliability, or security, each of the processing nodes is executed within a node container having a separated operating environment such as a virtual machine. Once the global memory segment has been allocated for the first data stream, a first local memory segment is allocated from a first local memory associated with a first node container containing the first processing node.

The first local memory segment is then mapped to the global memory segment of the global memory, such that the first processing node can access the data blocks of the first data stream via the mapped first local memory segment. In other words, a global memory address space of the global memory segment is mapped to a local memory address space of the first node container. The first processing node can simply access the mapped first local memory segment within the first node container to access the data blocks stored in the global memory segment, without security breach between the first node container and the global memory.

Subsequently, according to one embodiment, when a second request is received from a second processing node as a subscriber node to subscribe the first data stream, a second local memory segment is allocated from a second local memory associated with a second node container containing the second processing node. The second local memory segment is then mapped to the global memory segment, such that the second processing node can access the data blocks stored in the global memory segment via the mapped second local memory segment within the second node container, without security breach between the second node container and the global memory. The first local memory segment, the second local memory segment, and the global memory segment may be allocated from different memory devices or alternatively, they can be allocated from different memory regions or areas of the same memory device. In one embodiment, the first local memory segment, the second local memory segment, and the global memory segment are virtual memory segments as part of virtual memories specifically allocated for the node containers and memory manager. As a result, the efficiency of accessing data blocks produced by a producer node and subscribed by a subscriber node can be greatly improved while the stability, reliability, and security amongst the processing nodes can be maintained, by containing the processing node within a separate node container.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
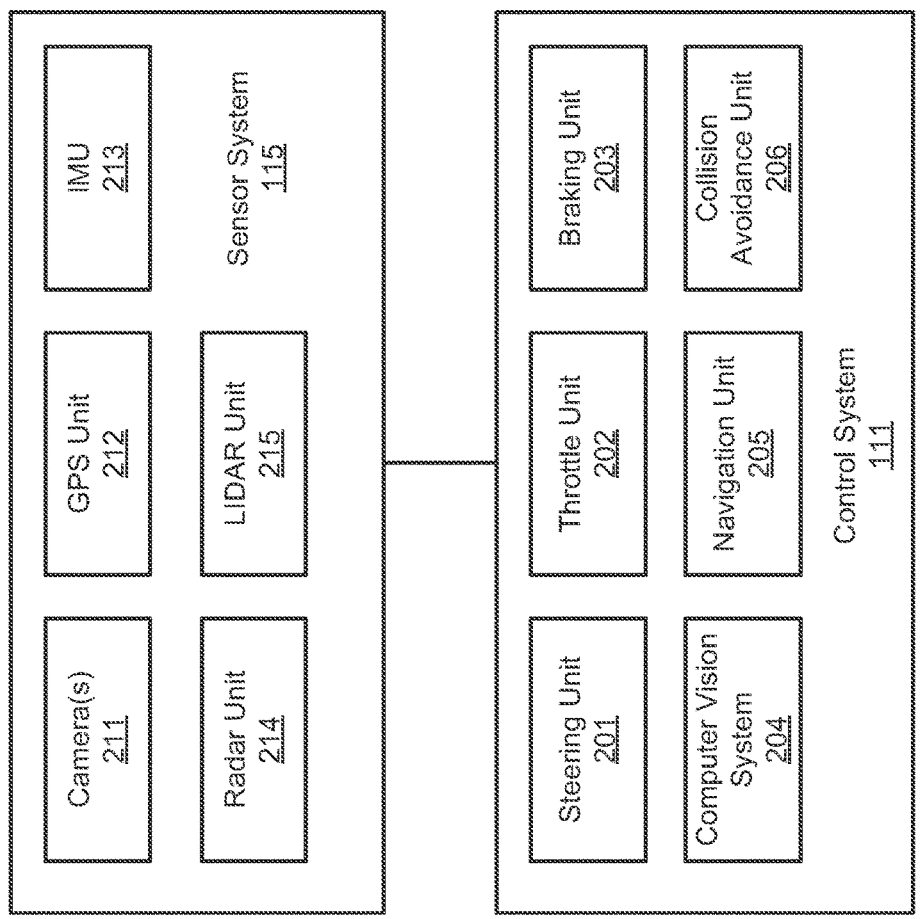
FIG. 2 is a block diagram illustrating an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and POI (MPOI) server, which may be a part of servers 103-104. The location server provides location services and MPOI server 105 provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In an autonomous vehicle, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., infotainment system 114 and/or data processing system 110. In such situation, an augmented image is displayed in a virtual reality manner via infotainment system 114, also referred to as an augmented reality manner.

For example, a content item received from a content database or from a remote content provider or content server may be superimposed onto an image captured locally by a camera to become an augmented image. The augmented image is then displayed on a display device within autonomous vehicle 101. The display device may be configured to appear as an ordinary window of a vehicle. When a user looks at the display device, the object of the image is displayed as a virtual object in a virtual reality manner as if the user looked at the physical object through an ordinary window of the vehicle. The display device may display a stream of augmented images (e.g., augmented video) in real time, which is similar or simulates an augmented reality (AR) environment.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information.

In one embodiment, the system ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, the system applies one or more content ranking models to each of the content items to determine a ranking score for each content item. A content item having a ranking score that is above a predetermined threshold may be selected. The content ranking models may be trained using sets of known features representing similar traveling environments or traffic conditions in the past. The content ranking models may also be trained based on user profiles of similar users.

The selected content item is then rendered and displayed on a display device within the autonomous vehicle. In one embodiment, the system further augments the selected content item onto an image that is captured at the point in time using one or more cameras of the autonomous vehicle. In one embodiment, an image recognition is performed on the image and to derive or understanding the content represented by the image. For example, one or more keywords may be derived to describe the image or a POI. The list of content items may be identified further based on the one or more keywords or the POI represented by the image. The system then augments the selected content item onto the image generate an augmented image, where the content item may be superimposed on the image. The augmented image is then displayed on a display device of the autonomous vehicle. Note that infotainment system 114 may be integrated with data processing system 110 according to some embodiments.

Alternatively, a user can specifically select from a list of precompiled content (e.g., videos, movies) from a content store or database, which may be periodically updated from a content server of a content provider over a network (e.g., cloud network). Thus, a user can specifically select the real-time actual content captured in real-time or previously rendered content to be displayed on the display device(s), for example, retrieved from data store 125. For example, if autonomous vehicle 101 is traveling in a snowy day in New York City, the user can switch the display devices to display a sunny environment in Hawaii as if autonomous vehicle 101 was traveling on a sunny day. The content may displayed in multiple display devices (e.g., multiple windows) in a collaborated or coordinated manner, i.e., virtual reality manner.

According to one embodiment, data processing system 110 includes a number of processing nodes, each processing node performing a specific function of operating autonomous vehicle 101. The processing nodes may be coordinated by a master node and hosted by an operating system suitable for operating and controlling autonomous vehicle 101, such as, for example, a robot operating system (ROS). ROS is a collection of software frameworks for robot software development, providing operating system-like functionality on a heterogeneous computer cluster. ROS provides standard operating system services such as hardware abstraction, low-level device control, implementation of commonly used functionality, message-passing between processes, and package management. Running sets of ROS-based processes are represented in a graph architecture where processing takes place in nodes that may receive, post and multiplex sensor, control, state, planning, actuator and other messages.

The functions of operating autonomous vehicle 101 performed by the processing nodes may include, for example, sensor processing, perception, planning and controls, objection identification, segmentation and recognition, face recognition, gesture recognition, motion tracking, motion understanding, stereo vision (e.g., depth perception via multiple cameras), etc. One or more of these functions can be performed by one or more of the processing nodes. In one embodiment, each of the processing nodes may be hosted and contained in a specific node container and managed by a master node. A node container may be a virtual machine or a sandboxed environment having a separated operating environment and a set of dedicated processing resources (e.g., processor, memory, storage, network stack).

In one embodiment, the processing nodes may communicate with each other via a shared memory-based communication mechanism. All of the communication data or messages may be stored in a global memory and accessed by the processing nodes via their mapped local memory address spaces within their respective node containers. A communication session between two processing node is constructed as a communication topic in a form of data (or message) producer node and a data subscriber node. The data to be exchanged is stored in a global memory segment allocated from a global memory associated with a master node.

Each of the producer node and subscriber node is to allocate a local memory segment from its local memory and map the global memory segment to its local memory segment. A producer node can then simply writes data to its mapped local memory segment, which in turn stores the data in the corresponding global memory segment. Similarly, a subscriber node can simply read data from its mapped local memory segment, which in turn reads the data from the corresponding global memory segment. By mapping the local memory segment to the global memory segment, a processing node can achieve higher performance while maintaining the security between the processing nodes by containing the processing nodes in separate node containers. When a communication session ends (e.g., all data have been read and no new data written), the global memory segment and the local memory segments can be unmapped and released back to the corresponding free memory pool.

Figure 3:
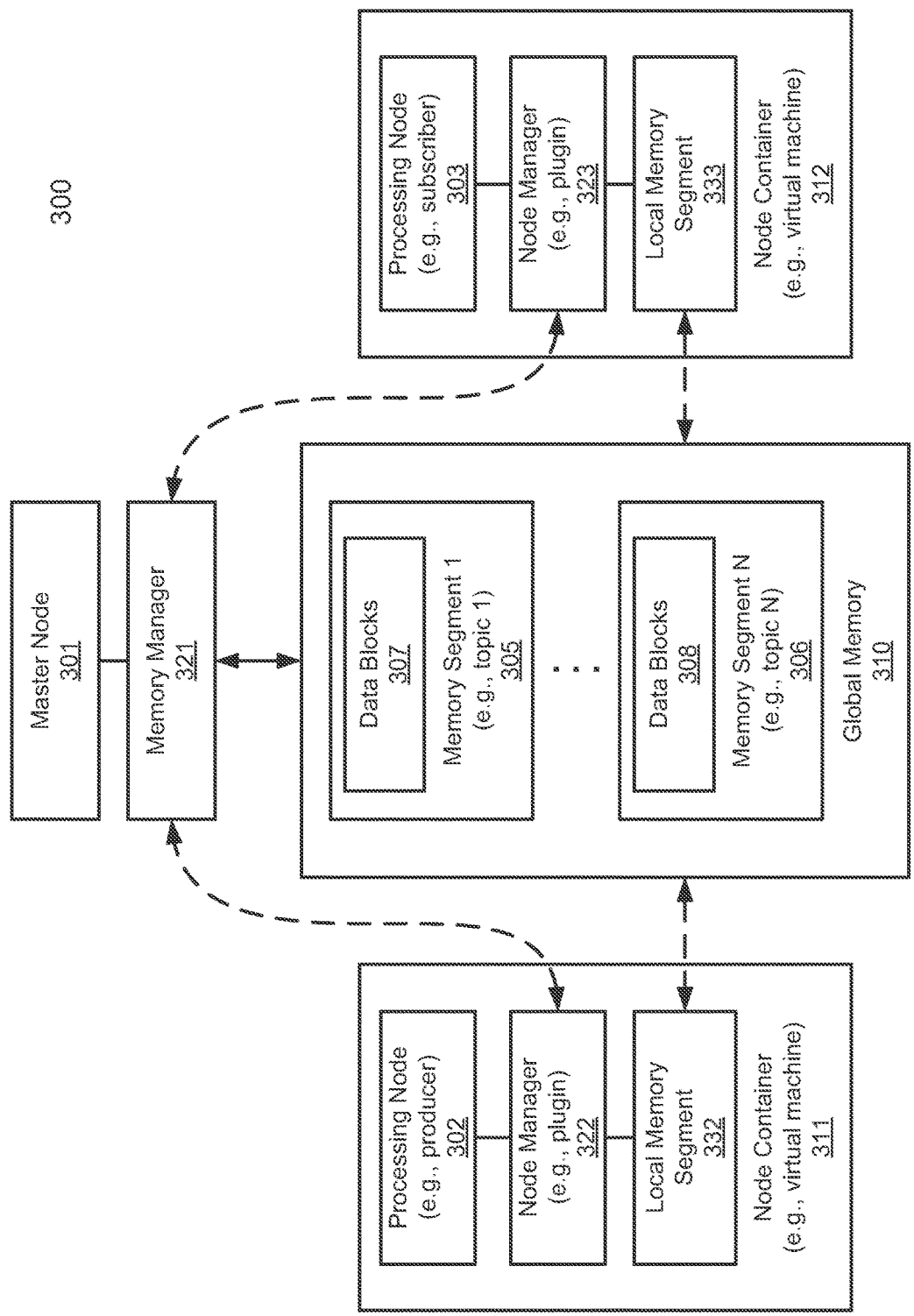
FIG. 3 is a block diagram illustrating a data processing system which may be utilized with an autonomous vehicle according to one embodiment of the invention.

FIG. 3 is a block diagram illustrating a data processing system which may be utilized with an autonomous vehicle according to one embodiment of the invention. System 300 may be implemented as part of data processing system 110 of FIG. 1. Referring to FIG. 3, system 300 includes, but is not limited to, master node 301 coordinating and/or managing processing nodes 302-303. Although there are two processing nodes 302-303 shown here, more or fewer processing nodes may be implemented. Nodes 301-303 may be loaded into a system memory and executed by one or more processors. Each of processing nodes 302-303 may perform one or more of the functions for operating an autonomous vehicle such as autonomous vehicle 101 of FIG. 1. The functions may include, but are not limited to, sensor processing, perception, planning and controls, objection identification, segmentation and recognition, face recognition, gesture recognition, motion tracking, motion understanding, stereo vision (e.g., depth perception via multiple cameras), etc.

In one embodiment, each of processing nodes 302-303 may be hosted in a specific node container, in this example, node containers 311-312, respectively. A node container refers to a sandboxed operating environment in which one or more processes of performing one or more functions of operating an autonomous vehicle are executed. A node container has a set of dedicated processing resources, such as, for example, processor, memory, storage, network bandwidth, etc., which may be implemented as a set of physical processing resources. Alternatively, the processing resources associated with a node container may be a logical set of processing resources allocated from a set of global processing resources shared by other node containers hosting other processing nodes. Typically, a node container provides an isolated or sandboxed operating environment that a component running within a node container cannot directly access any resources external to the node container. For example, a process node hosted within a node container may not directly access a global memory external to the node container. In one embodiment, each of node containers 311-312 is implemented as a virtual machine.

In computing, a virtual machine (VM) is an emulation of a particular computer system. Virtual machines operate based on the computer architecture and functions of a real or hypothetical computer, and their implementations may involve specialized hardware, software, or a combination of both. There are different kinds of virtual machines, each with different functions. System virtual machines (also known as full virtualization VMs) provide a complete substitute for the targeted real machine and a level of functionality required for the execution of a complete operating system. A hypervisor uses native execution to share and manage hardware, allowing multiple different environments, isolated from each other, to be executed on the same physical machine. Modern hypervisors use hardware-assisted virtualization, which provides efficient and full virtualization by using virtualization-specific hardware capabilities, primarily from the host processors. Process virtual machines are designed to execute a single computer program by providing an abstracted and platform-independent program execution environment. Some virtual machines are designed to also emulate different architectures and allow execution of software applications and operating systems written for another processor or architecture. Operating-system-level virtualization allows the resources of a computer to be partitioned via the kernel's support for multiple isolated user space instances, which are usually called containers and may look and feel like real machines to the end users.

Referring back to FIG. 3, master node 301 may be implemented as part of a virtual machine monitor or manager (VMM) or as part of a virtualization layer. Master node 301 may be running or contained within a master node container. For example, master node 301 may be hosted by a host operating system, while processing nodes 302-303 may be hosted by a guest operating system respectively. Master node 301 is to coordinate or manage processing nodes 302-303 hosted in node containers 311-312. In one embodiment, memory manager 321 (also referred to as a shared memory communication manager) is to manage memory usage amongst processing nodes 302-303. Memory manager 321 communicates with node managers 322-323 of node containers 311-312, for example, via an application programming interface (API). Node managers 322-323 may be implemented as a plugin to respective processing nodes 302-303. As described above, each of processing nodes 302-303 has a specific or preconfigured functionality of operating an autonomous vehicle. Processing nodes 302-303 may be part of a standard set of libraries provided by an operating system (e.g., ROS operating system). Similarly, memory manager 321 may be implemented as part of or as a plugin to master node 301, where master node 301 may contain standard management functionality provided by the operating system.

According to one embodiment, memory manager 321 is responsible for managing memory usage of global memory 310, including allocating and deallocating global memory segments for storing data streams associated with different communication topics or sessions. Node managers 322-323 are responsible for mapping their respective local memory segments 332-333 to the related global memory segments for accessing (e.g., writing, reading) data blocks of the data streams stored in the global memory segments via the corresponding mapped local memory segments 332-333 within their respective node containers 311-312. In this example, processing node 302 is a producer node to produce one or more data streams and processing node 303 is a subscriber or consumer node to subscribe or consume one or more data streams.

In one embodiment, when processing node 302 is to publish or produce a new data stream, node manager 322 communicates with memory manager 321, for example, via an API, to request posting a data stream. In response to the request, memory manager 321 allocates a global memory segment from global memory 310 for storing and maintaining data blocks of the data stream. In this example, global memory 310 contains an array of global memory segments 305-306, each storing data blocks (e.g., data blocks 307-308) corresponding to a specific data stream. A data stream herein refers to data exchanged amongst processing nodes in a particular communication session, where a global memory segment is utilized to maintain data blocks of the data stream.

In this example, in response to the request, memory manager 321 allocates global memory segment 305 for processing node 302. Memory manager 321 returns a memory pointer of global memory segment 305 to node manager 322. In response to the memory pointer, node manager 322 allocates a local memory segment, in this example, local memory segment 332. Node manager 322 then maps local memory segment 332 to global memory segment 305. Node manager 322 may call a memory mapping function provided by an operating system hosting node manager 322 to map local memory segment 332 to global memory segment 305. Thereafter, when processing node 302 attempts to post a data block, processing node 302 and/or node manager 322 can simply writes the data block to a proper location within local memory segment 332 within node container 311, which the data block is in turn written in a corresponding location of global memory segment 305.

Similarly, according to one embodiment, when processing node 303 is to subscribe a data stream produced by processing node 302, node manager 323 communicates with memory manager 321 via an API to request the subscription. In response to the request, memory manager 321 identifies a global memory segment corresponding to the requested data stream, in this example, global memory segment 305. Memory manager 321 may maintain a data structure or index (not shown) recording data streams and their associated global memory segments, as well as their producer nodes. Memory manager 321 returns a memory pointer to the identified global memory segment to node manager 323. In response to the memory pointer, node manager 323 allocates and maps local memory segment 333 of its local memory to global memory segment 305. Thereafter, processing node 303 can access data blocks 307 stored in global memory segment 305 by simply reading the data blocks via local memory segment 333 within node container 312.

In one embodiment, memory manager 321 also performs certain management or house-keeping functions for global memory segments 305-306. Memory manager 321 may periodically monitor the usage of global memory 310 and the interactions from processing nodes 302-303. When a communication session ends, its corresponding global memory segment may be released or deallocated for future reuse. For example, if all of the data blocks of a data stream have been read by all of the subscribers and there is no new data block produced by a corresponding producer node for a predetermined period of time, the corresponding global memory segment may be released. Alternatively, if a producer node and all of the subscriber nodes have deregistered from the communication topic, for example, via an API, the associated global memory segment can be released. Again, memory manager 321 may maintain information who has registered with which of the communication topics. There may be an API to allow any processing node to register and/or deregister from a particular communication topic.

In one embodiment, prior to releasing or deallocating a global memory segment (e.g., global memory segment 305), memory manager 321 communicates with (e.g., via a communication interface such as an API) a producer node and all subscriber nodes to allow the producer node and the subscriber node(s) to deregister, unmap, and release their corresponding local memory segments (e.g., local memory segments 332-333).

In one embodiment, the data blocks of a data stream may be stored in a preconfigured circular buffer, also referred to as a circular queue, a cyclic buffer, or a ring buffer. In one embodiment, memory manager 321 may coordinate with node managers 322-323 to ensure the coherency of accessing data blocks of a data stream stored in a global memory segment. In one embodiment, in order to write a data block to the global memory segment, a producer node has to acquire an exclusive lock of at least the data block being accessed. On the other hand, a subscriber may or may not need to acquire an exclusive lock to read a data block. Memory manager 321 and/or a node manager of a processing node are responsible to maintain and enforce who can or cannot access a particular data block by examining the status of the data block.

In addition, it is important to prevent the situation in which a producer node produces data blocks much faster than a subscriber node reading the data blocks, or vice versa. A communication interface may be maintained to allow a producer node or a subscriber node to register a callback when the counterpart processing node cannot keep up the speed. For example, if a subscriber node have finished reading all of the data blocks, while a producer node cannot keep up with the speed of producing new data blocks, the subscriber node may register a callback. When there is a new data block becoming available subsequently, memory manager 321 notifies the subscriber node, such that the subscriber node can resume consuming the data blocks. Similarly, a producer node can also register a callback when a subscriber node cannot keep up with the speed of reading the data blocks. When there is a data block that has been read and its storage space becomes available, the producer node may be notified via a callback interface to resume producing new data blocks.

Note that local memory segment 332, local memory segment 333, and global memory segments 305-306 may be allocated from different memory devices (e.g., different physical memory devices) or alternatively, they can be allocated from different memory regions or areas of the same memory device. In one embodiment, local memory segment 332, local memory segment 333, and global memory segments 305-306 are virtual memory segments as part of virtual memories specifically allocated for the node containers 311-312 and memory manager 321.

In computing, virtual memory is a memory management technique that is implemented using both hardware and software. It maps memory addresses used by a program, called virtual addresses, into physical addresses in computer memory. Main storage as seen by a process or task appears as a contiguous address space or collection of contiguous segments. The operating system manages virtual address spaces and the assignment of real memory to virtual memory. Address translation hardware in a processor, often referred to as a memory management unit or MMU, automatically translates virtual addresses to physical addresses. Software within the operating system may extend these capabilities to provide a virtual address space that can exceed the capacity of real memory and thus reference more memory than is physically present in the computer. The primary benefits of virtual memory include freeing applications from having to manage a shared memory space, increased security due to memory isolation, and being able to conceptually use more memory than might be physically available, using the technique of paging.

Note that a processing node can be a producer node and/or a subscriber node. A processing node can produce one or more data streams and concurrently subscribe one or more data streams produced by another processing node. In one embodiment, there is only one producer node for each communication topic, while there may be more than one subscriber node for a communication topic. A shared global memory segment is utilized herein as a one-way communication channel from a producer node to one or more subscriber nodes. In another embodiment, there may be multiple producer nodes and one or more subscriber nodes for a given communication topic.

Figure 4:
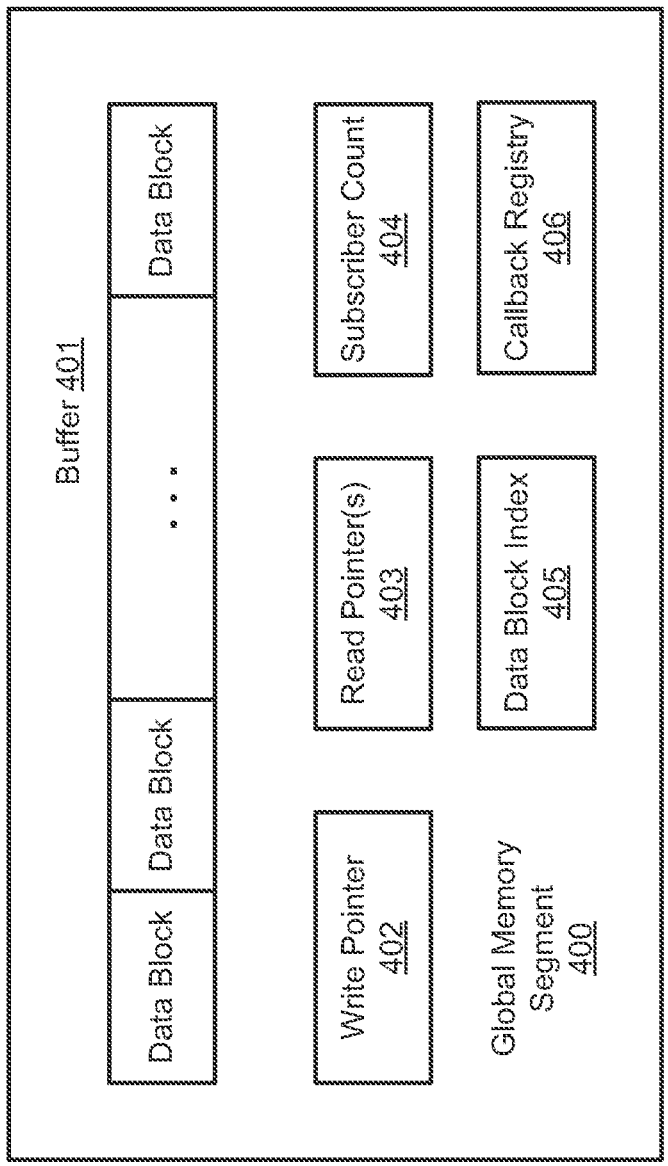
FIG. 4 is a block diagram illustrating an example of a global memory segment according to one embodiment of the invention.

FIG. 4 is a block diagram illustrating an example of a global memory segment according to one embodiment of the invention. Global memory segment 400 may represent any of global memory segments 305-306 of FIG. 3. Referring to FIG. 4, global memory segment 400 includes, but is not limited to, data buffer 401 to store data blocks produced by a producer node and consumed by one or more subscriber nodes. Buffer 401 may be a circular buffer or a first-in-first-out (FIFO) buffer. A circular buffer refers to a data structure that uses a single, fixed-size buffer as if it were connected end-to-end. This structure lends itself easily to buffering data streams. The useful property of a circular buffer is that it does not need to have its elements shuffled around when one is consumed.

In addition, global memory segment 400 includes certain memory segment metadata, such as, for example, write pointer 402, one or more read pointers 403, subscriber count 404, data block index 405, and callback registry 406. Writer pointer 402 stores a memory address pointing to one of the data blocks stored in buffer 401 as a next data block a producer node would write a new data block on a next write cycle. Read pointers 403 store memory addresses pointing to one or more of the data blocks stored in buffer 401 from which one or more subscriber nodes would read a next data block on a next read cycle. The number of read pointers correspond to a number of subscriber nodes currently subscribe, which may be recorded as part of subscriber count 404. If there are multiple producer nodes, write pointer 402 is shared amongst the producer nodes. Write pointer 402 may be utilized as part of an exclusive lock to allow one producer to write data at a given point in time. Callback registry 406 records the processing nodes, either being a producer node or a subscriber node, which have registered for a callback notification. Periodically, a processing logic, such as memory manager 321, may scan callback registry 406 to determine whether there is a need to notify a processing node in view of the statuses of data blocks stored in buffer 401.

Data block index 405 may record the specific status of data blocks stored in buffer 401. For example, a block status may be one of "being read," "being written," or "default" or "idle." The status of "being written" indicates that a producer node is writing a new data block at the corresponding block location of buffer 401. The status of "being read" indicates that a subscriber node is reading the corresponding data block. The status of "idle" or "default" indicates that there is no processing node currently accessing the corresponding data block. The block statuses of data block index 405 may be utilized as exclusive access locks or privileges for accessing the corresponding block locations. If multiple subscribers are allowed to concurrently read data blocks, the status of "being read" may not be needed; only "being written" is needed as a subscriber is not allowed to access a data block while a producer node is writing to the same data block.

FIG. 5A is a block diagram illustrating a data structure for storing segment metadata according to one embodiment of the invention. Data structure 500 may be maintained in a global memory segment to store segment metadata, such as metadata 402-406 as shown in FIG. 4. Referring to FIG. 5, data structure 500, in this example, a table, includes a number of entries. Each entry corresponding to a processing node 501, either being a producer node or a subscriber node. Each entry further includes field 502 to store an access pointer pointing to a memory address of a data block that processing node 501 is to access a next data block. For a producer node, access pointer 502 is a write pointer and for a subscriber node, access pointer 502 is a read pointer.

In one embodiment, processing logic, such as memory manager 321 and/or a node manager of a processing node, can examine the pointers 502 to determine which data blocks have been read and whether all of the data blocks have been read. The processing logic can also determine the speed of producing new data blocks and subscribing data blocks based on the pointers 502. If a read pointer is the same as or close to a write pointer, it may indicate that most or all of the data blocks have been read. It may also indicate a particular processing node is accessing data blocks faster than another processing node or counterpart processing node. If there are multiple producer nodes, a write pointer is shared amongst the producer nodes. The write pointer may be utilized as part of an exclusive lock to allow one producer to write data at a given point in time. Prior to writing data, a producer node or the memory manager may determine who has acquired the write pointer.

In one embodiment, each entry may further includes field 503 to store a timestamp indicating the time when pointer 502 was updated. Timestamp 503 may be used to determine whether there is any new data block produced by a producer node. If write pointer 502 of a producer node has not been updated for a period of time as indicated by timestamp 503, it can be interpreted as there is no new data block produced. Similarly, if a subscriber node has not updated its read pointer for a predetermined of time, it may indicate that the subscriber node no longer subscribes the communication topic. Such an indication, in combination of how close the write pointer and read pointers are as indicated in field 502, the processing logic can determine whether all of the data blocks have been read by the subscribers and whether there is no new data block produced for a predetermined period of time. If so, the corresponding communication session may end and the corresponding global memory segment may be released. Alternatively, timestamp 503 may be used to determine whether a particular processing node malfunctions. For example, if a particular processing node has not updated its pointer for a period of time, the processing node may have crashed or may be stuck in a loop. The processing logic can then reset some of the information stored in data structure to restart the communication session.

In one embodiment, each entry further includes field 504 to store an indicator indicating whether a particular processing node is to be notified via a callback interface. As described above, when a processing node (e.g., producer node or subscriber node) accesses data blocks much faster than its counterpart (e.g., subscriber node or producer node), the processing node can register a callback and then transitions to a sleep state or perform another task while waiting. When there is a new data block becoming available or a data block has been read and its location becoming available, the processing logic may scan field 504 to determine which of the processing nodes needs to be notified. If field 504 of a processing node is set to a predetermined value, the processing node will be notified to resume accessing data blocks.

FIG. 5B is a block diagram illustrating a data structure representing a data block index according to one embodiment of the invention. Data block index 550 may be implemented as part of data block index 405 of FIG. 4. Referring to FIG. 5B, in one embodiment, data block index 550 includes a number of entries, each entry corresponding to one of the data blocks in a global memory segment and indexed by data block identifier (ID) 551. Data block ID 551 may be the sequential order location within a data buffer such as buffer 401 of FIG. 4. Each entry further includes field 552 to store a status for the corresponding data block. Status 552 can be one of "being written," "being read," or default (or blank/empty). Status 552 can be utilized as part of an exclusive access lock or an indicator indicating whether a processing node attempts accessing the corresponding data block.

Each entry may further include node ID 553 indicating who is accessing the data block, as well as timestamp 554 indicating how long the processing node (identified by node ID 553) has been accessing the data block (e.g., how long the processing node has acquired and possessed the exclusive access lock). Such information may be utilized to determine whether a particular processing node has been stuck or malfunctioned. For example, if a processing node has been accessing a data block for a predetermined period of time, the processing node may be interpreted as a malfunction node, and a reset process may be performed to resolve the deadlock situation.

The techniques described above can also be utilized to support a publisher and/or a subscriber with different write/read strategies (e.g., message discard strategy). For example, on one hand, if the latency and throughput performance is a key consideration for an application running inside a container, a publisher can take the aggressive strategy of always writing to any available blocks regardless of its order with the previous written block. Alternatively, the subscriber can take the strategy of always follow the writer (the last updated block) regardless where the previous read happens. Under these strategies, the system is more responsive with a lower latency and a possible larger throughput. On the other hand, a publisher and/or a subscriber can also try to write or read the next memory block in order. If the intended block is not available for write/read, the publisher/subscriber will be blocked and wait for a period of time. Under such conservative strategies, the general performance may suffer but the system will have a more consistent and predictable behavior. For example, when a transmit rate or publication/subscription ratio suddenly changes due to changes of self-driving scenarios or temporary burden of system resource, such strategies can adjust the communication rate dynamically without causing unnecessary skipping or dropping of data blocks or messages.

Figure 6:
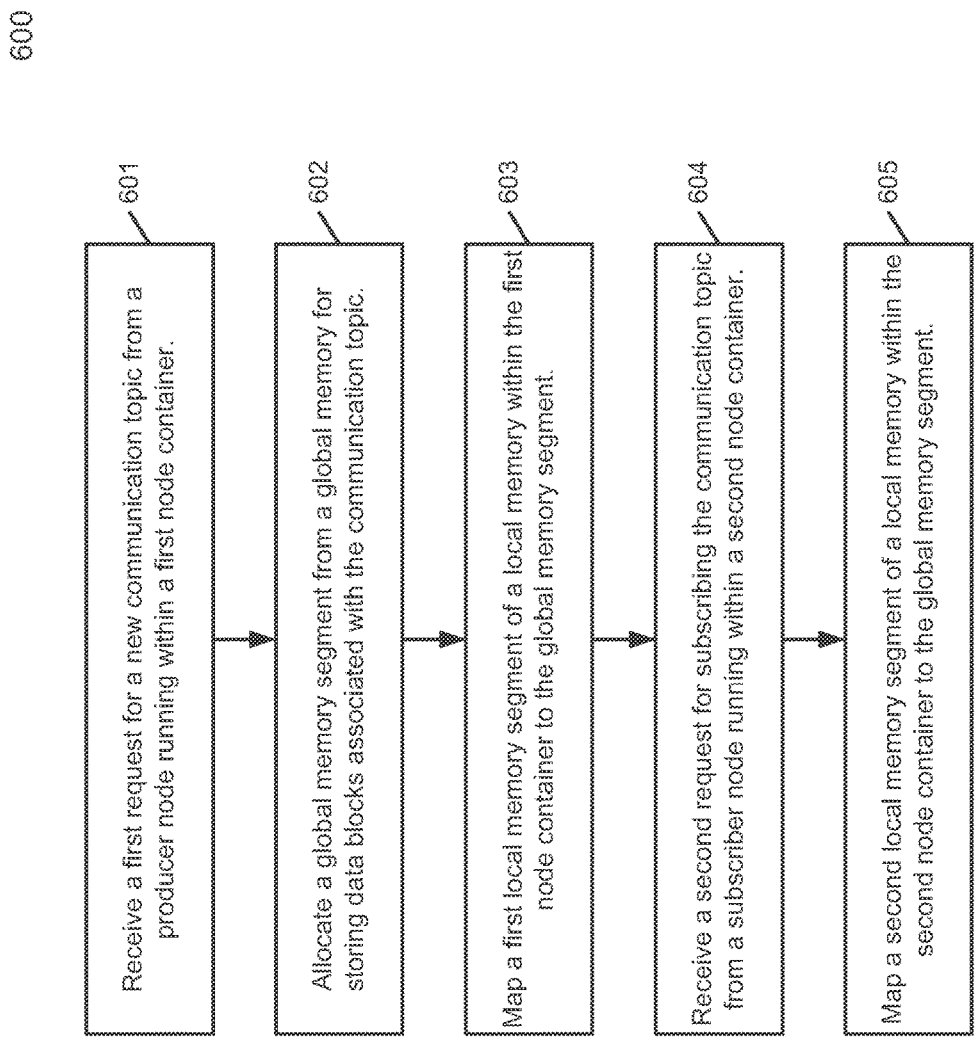
FIG. 6 is a flow diagram illustrating a process of memory management of operating an autonomous vehicle according to one embodiment of the invention.

FIG. 6 is a flow diagram illustrating a process of memory management of operating an autonomous vehicle according to one embodiment of the invention. Process 600 may be performed by processing logic which may include software, hardware, or a combination thereof. For example, process 600 may be performed by system 300 of FIG. 3, particularly by memory manager 321. Process 600 may be performed in response to a request for a new communication session (e.g., on demand) or alternatively, process 600 may be performed during the initialization (e.g., booting) of the system. Referring to FIG. 6, at block 601, processing logic receives a first request for a new communication topic (e.g., new communication session) from a producer node running within a first node container. In response to the first request, at block 602, processing logic allocates a global memory segment from a global memory (e.g., global memory address space) for storing data blocks associated with the new communication topic. At block 603, processing logic maps a first local memory segment of a local memory within the first node container to the global memory segment. In one embodiment, processing logic returns a pointer (e.g., memory address) of the global memory segment to the producer node to allow the producer node to map the global memory segment to a first local memory segment of a local memory within the first node container. Subsequently at block 604, processing logic receives a second request to subscribe the communication topic from a subscriber node running within a second node container. In response to the second request, at block 605, processing logic maps a second local memory segment of a local memory within the second node container to the global memory segment. In one embodiment, processing logic returns the pointer of the global memory segment to the subscriber node to allow the subscriber node to map the global memory segment to a second local memory segment allocated from a second local memory within the second node container.

Figure 7:
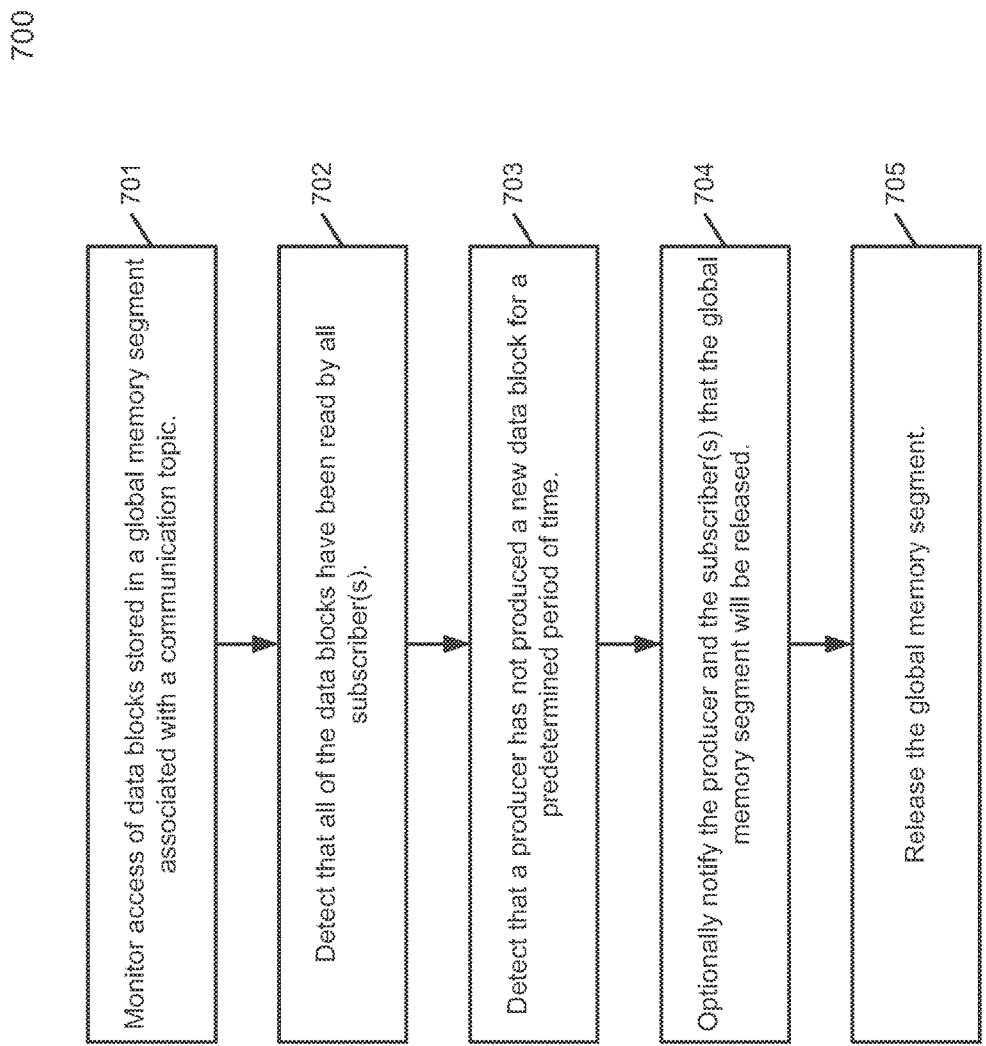
FIG. 7 is a flow diagram illustrating a process of memory management of operating an autonomous vehicle according to another embodiment of the invention.

FIG. 7 is a flow diagram illustrating a process of memory management of operating an autonomous vehicle according to one embodiment of the invention. Process 700 may be performed by processing logic which may include software, hardware, or a combination thereof. For example, process 700 may be performed by system 300 of FIG. 3, particularly by memory manager 321 periodically. Referring to FIG. 7, at block 701, processing logic monitors access of data blocks stored in a global memory segment associated with a communication topic. At block 702, processing logic detects that all of the data blocks have been read by all subscribers, for example, by comparing a writer pointer and read pointer(s). At block 703, processing logic detects that a producer has not produced a new data block for a predetermined period of time, for example, by examining the write pointer and its timestamp. At block 704, processing logic optionally notifies the producer and the subscriber(s) that the global memory segment will be released. Such notification would allow the producer and the subscriber(s) to unmap and release their respective local memory segments. At block 705, processing logic releases the global memory segment back to the free memory pool for future usage.

Figure 8:
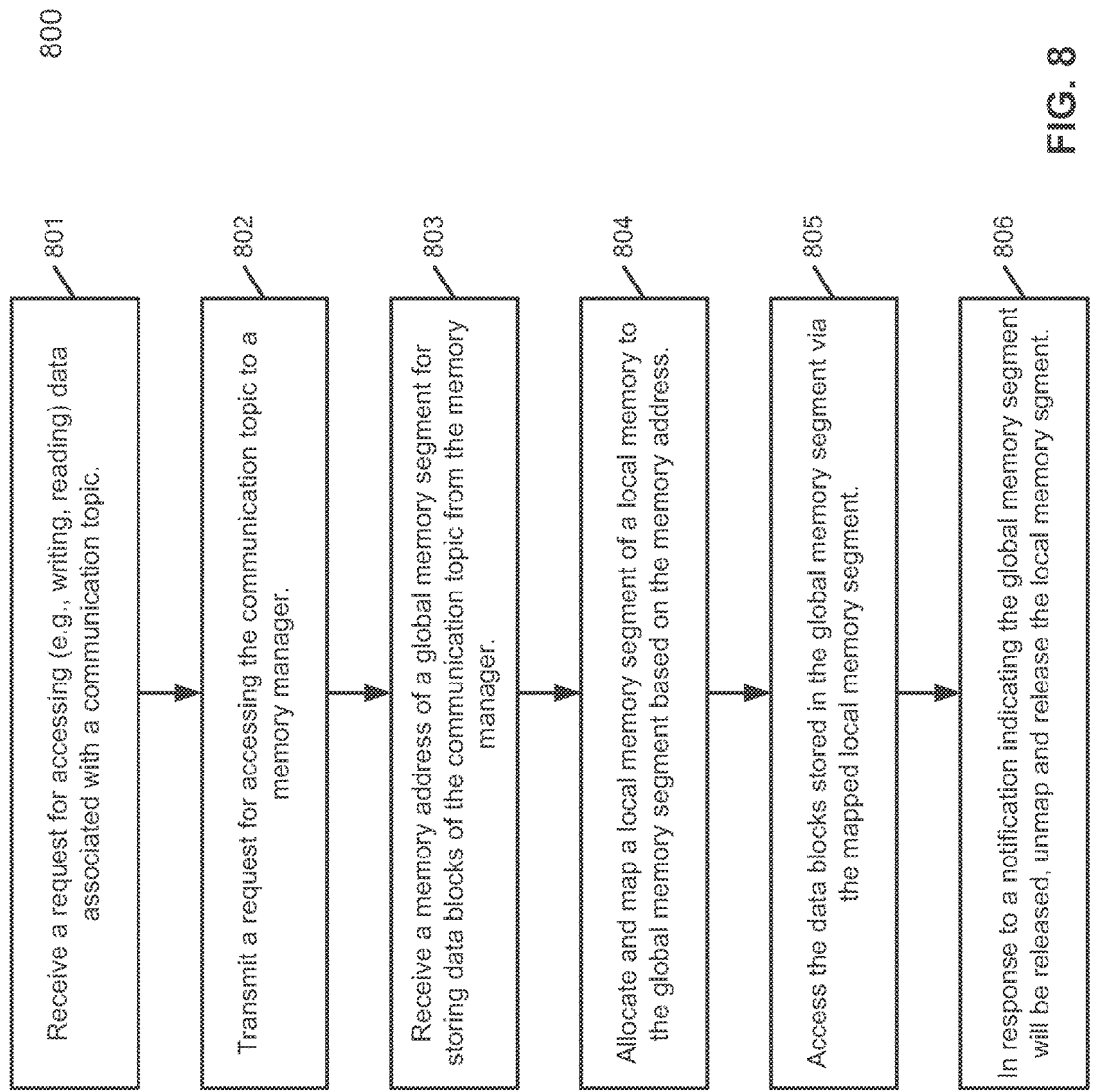
FIG. 8 is a flow diagram illustrating a process of memory management of operating an autonomous vehicle according to another embodiment of the invention.

FIG. 8 is a flow diagram illustrating a process of memory management of operating an autonomous vehicle according to one embodiment of the invention. Process 800 may be performed by processing logic which may include software, hardware, or a combination thereof. For example, process 800 may be performed by system 300 of FIG. 3, particularly by a node manager of a processing node. Referring to FIG. 8, at block 801, processing logic receives a request for accessing (e.g., producing, subscribing) a communication topic. At block 802, processing logic transmits a request for accessing the communication topic to a memory manager, for example, via an API. At block 803, processing logic receives a memory pointer of a global memory segment corresponding to the communication topic from the memory manager. At block 804, processing logic allocates and maps a local memory segment from a local memory to the global memory segment based on the memory pointer. At block 805, processing logic accesses the data stored in the global memory segment via the mapped local memory segment. Subsequently in response to a notification indicating that the global memory segment will be released, at block 806, processing logic unmaps and releases the local memory segment.

Figure 9:
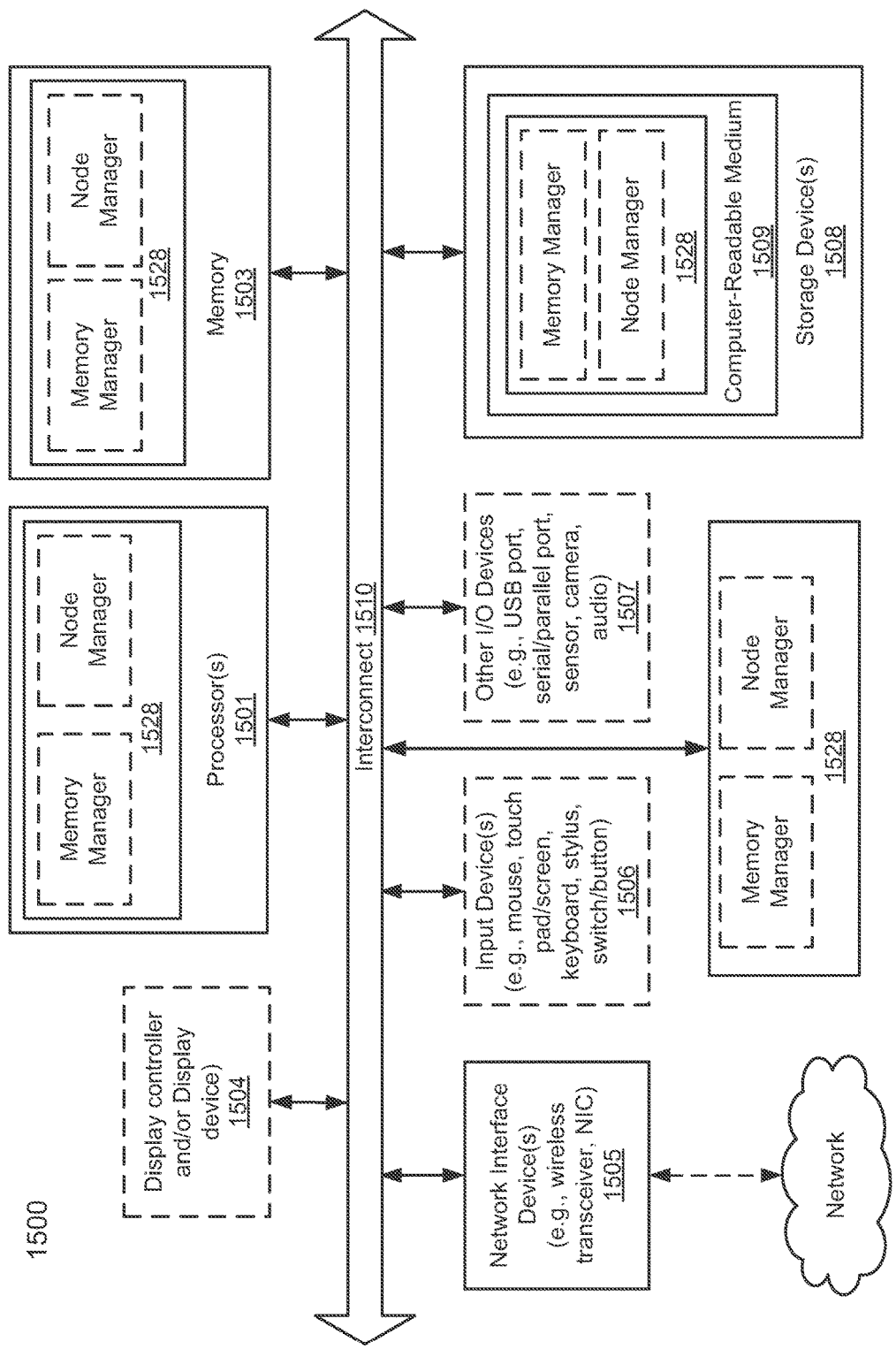
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data streams of processing nodes in an autonomous vehicle, the method comprising:
    receiving a first request from a first processing node to produce data blocks of a first data stream representing a first communication topic to be subscribed by another processing node, wherein the first processing node is one of a plurality of processing nodes, each processing node handling a specific function of operating an autonomous vehicle, and wherein each of the processing nodes is executed within a specific node container having a specific operating environment;
    in response to the first request, allocating a global memory segment from a global memory to store the data blocks of the first data stream;
    mapping a first local memory segment to the global memory segment, the first local memory segment being allocated from a first local memory of a first node container containing the first processing node, wherein the first processing node directly accesses the data blocks of the first data stream stored in the global memory segment by accessing the mapped first local memory segment within the first node container;
    receiving a second request from a second processing node to subscribe the first communication topic; and
    in response to the second request, mapping a second local memory segment to the first global memory segment, the second local memory segment being allocated from a second local memory of a second node container containing the second processing node, wherein the second processing node directly accesses the data blocks of the first data stream stored in the global memo segment by accessing the mapped second local memory segment within the second node container.

2. The method of claim 1, wherein the first data stream is one of a plurality of data streams associated with a plurality of communication topics, and wherein each of the data streams is associated with one of a plurality of global memory segments allocated from the global memory for storing corresponding data blocks, respectively.

3. The method of claim 1, wherein the first node container comprises a first virtual machine and the first local memory is associated with the first virtual machine, and wherein the second node container comprises a second virtual machine and the second local memory is associated with the second virtual machine.

4. The method of claim 1, wherein the second processing node is one of a plurality of processing nodes subscribing the first communication topic, and wherein each of the subscribing processing nodes maps a local memory segment from its respective local memory to the first global memory segment for accessing the data blocks of the first data stream.

5. The method of claim 1, further comprising:
    monitoring access of the data blocks stored in the first global memory segment by the first processing node and the second processing node; and
    releasing the first global memory segment back to a free global memory pool of the global memory if the access is inactive for a predetermined period of time.

6. The method of claim 5, wherein monitoring access of the data blocks stored in the first global memory segment comprises:
    determining whether all data blocks of the first data stream have been read by the second processing node; and
    determining whether there is any new data block produced by the first processing node, wherein the first global memory segment is released if all data blocks of the first data stream have been read and no new data block has been produced for the predetermined period of time.

7. The method of claim 6, further comprising, prior to releasing the global memory segment:
    unmapping the first local memory segment of the first local memory from the global memory segment; and
    unmapping the second local memory segment of the second local memory from the global memory segment.

8. A non-transitory machine-readable medium having instructions stored therein, which when executed by a processor, cause the processor to perform operations of managing data streams of processing nodes in an autonomous vehicle, the operations including
    receiving a first request from a first processing node to produce data blocks of a first data stream representing a first communication topic to be subscribed by another processing node, wherein the first processing node is one of a plurality of processing nodes, each processing node handling a specific function of operating an autonomous vehicle, and wherein each of the processing nodes is executed within a specific node container having a specific operating environment;
    in response to the first request, allocating a global memory segment from a global memory to store the data blocks of the first data stream;
    mapping a first local memory segment to the global memory segment, the first local memory segment being allocated from a first local memory of a first node container containing the first processing node, wherein the first processing node directly accesses the data blocks of the first data stream stored in the global memory segment by accessing the mapped first local memory segment within the first node container;

receiving a second request from a second processing node to subscribe the first communication topic; and in response to the second request, mapping a second local memory segment to the first global memory segment, the second local memory segment being allocated from a second local memory of a second node container containing the second processing node, wherein the second processing node directly accesses the data blocks of the first data stream stored in the global memory segment by accessing the mapped second local memory segment within the second node container.

9. The machine-readable medium of claim 8, wherein the first data stream is one of a plurality of data streams associated with a plurality of communication topics, and wherein each of the data streams is associated with one of a plurality of global memory segments allocated from the global memory for storing corresponding data blocks, respectively.

10. The machine-readable medium of claim 8, wherein the first node container comprises a first virtual machine and the first local memory is associated with the first virtual machine, and wherein the second node container comprises a second virtual machine and the second local memory is associated with the second virtual machine.

11. The machine-readable medium of claim 8, wherein the second processing node is one of a plurality of processing nodes subscribing the first communication topic, and wherein each of the subscribing processing nodes maps a local memory segment from its respective local memory to the first global memory segment for accessing the data blocks of the first data stream.

12. The machine-readable medium of claim 8, wherein the operations further comprise:

monitoring access of the data blocks stored in the first global memory segment by the first processing node and the second processing node; and releasing the first global memory segment back to a free global memory pool of the global memory if the access is inactive for a predetermined period of time.

13. The machine-readable medium of claim 12, wherein monitoring access of the data blocks stored in the first global memory segment comprises:

determining whether all data blocks of the first data stream have been read by the second processing node; and determining whether there is any new data block produced by the first processing node, wherein the first global memory segment is released if all data blocks of the first data stream have been read and no new data block has been produced for the predetermined period of time.

14. The machine-readable medium of claim 13, wherein the operations further comprise, prior to releasing the global memory segment:

unmapping the first local memory segment of the first local memory from the global memory segment; and unmapping the second local memory segment of the second local memory from the global memory segment.

15. A data processing system, comprising:

a processor; and a memory coupled to the processor for storing instructions, which when executed by the processor, cause the processor to perform operations of managing data streams of processing nodes in an autonomous vehicle, the operations including receiving a first request from a first processing node to produce data blocks of a first data stream representing a first communication topic to be subscribed by another processing node, wherein the first processing node is one of a plurality of processing nodes, each processing node handling a specific function of operating an autonomous vehicle, and wherein each of the processing nodes is executed within a specific node container having a specific operating environment, in response to the first request, allocating a global memory segment from a global memory to store the data blocks of the first data stream, mapping a first local memory segment to the global memory segment, the first local memory segment being allocated from a first local memory of a first node container containing the first processing node, wherein the first processing node directly accesses the data blocks of the first data stream stored in the global memory segment by accessing the mapped first local memory segment within the first node container, receiving a second request from a second processing node to subscribe the first communication topic, and in response to the second request, mapping a second local memory segment to the first global memory segment, the second local memory segment being allocated from a second local memory of a second node container containing the second processing node, wherein the second processing node directly accesses the data blocks of the first data stream stored in the global memory segment by accessing the mapped second local memo segment within the second node container.

16. The system of claim 15, wherein the first data stream is one of a plurality of data streams associated with a plurality of communication topics, and wherein each of the data streams is associated with one of a plurality of global memory segments allocated from the global memory for storing corresponding data blocks, respectively.

17. The system of claim 15, wherein the first node container comprises a first virtual machine and the first local memory is associated with the first virtual machine, and wherein the second node container comprises a second virtual machine and the second local memory is associated with the second virtual machine.

18. The system of claim 15, wherein the second processing node is one of a plurality of processing nodes subscribing the first communication topic, and wherein each of the subscribing processing nodes maps a local memory segment from its respective local memory to the first global memory segment for accessing the data blocks of the first data stream.

19. The system of claim 15, wherein the operations further comprise:

monitoring access of the data blocks stored in the first global memory segment by the first processing node and the second processing node; and releasing the first global memory segment back to a free global memory pool of the global memory if the access is inactive for a predetermined period of time.

20. The system of claim 19, wherein monitoring access of the data blocks stored in the first global memory segment comprises:
- determining whether all data blocks of the first data stream have been read by the second processing node; and
- determining whether there is any new data block produced by the first processing node, wherein the first global memory segment is released if all data blocks of the first data stream have been read and no new data block has been produced for the predetermined period of time.

21. The system of claim 20, wherein the operations further comprise, prior to releasing the global memory segment:
- unmapping the first local memory segment of the first local memory from the global memory segment; and
- unmapping the second local memory segment of the second local memory from the global memory segment.

* * * * *